US012729683B2

(12) United States Patent
Enes et al.

(10) Patent No.: US 12,729,683 B2
(45) Date of Patent: Sep. 8, 2026

(54) SCROLL COMPRESSOR WITH ROLLING ELEMENT BEARINGS

(71) Applicant: AKTIEBOLAGET SKF, Gothenburg (SE)

(72) Inventors: Michael Enes, Fairport, NY (US); Rudolf Hauleitner, Ann Arbor, MI (US); Hans Wallin, Cape Coral, FL (US); Guillermo Enrique Morales Espejel, Ijsselstein (NL)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 18/581,731

(22) Filed: Feb. 20, 2024

(65) Prior Publication Data

US 2025/0264102 A1 Aug. 21, 2025

(51) Int. Cl.

| | |
|---|---|
| ***F04C 18/02*** | (2006.01) |
| ***F04C 29/02*** | (2006.01) |
| ***F16C 19/08*** | (2006.01) |

(52) U.S. Cl.

CPC .......... *F04C 18/0215* (2013.01); *F04C 29/02* (2013.01); *F16C 19/08* (2013.01); *F04C 2240/50* (2013.01); *F16C 2360/00* (2013.01)

(58) Field of Classification Search

CPC ...... F04C 18/0215; F04C 29/02; F04C 29/00; F04C 29/0057; F04C 23/008; F04C 19/08; F04C 2240/50; F16C 2360/00

See application file for complete search history.

(56) References Cited

U.S. PATENT DOCUMENTS

| | | | | |
|---|---|---|---|---|
| RE33,236 E * | 6/1990 | Hazaki | F01C 21/02 418/55.6 |
| 5,346,375 A | 9/1994 | Akiyama et al. | |
| 5,469,713 A * | 11/1995 | Wardle | F16C 33/6688 62/84 |
| 5,807,920 A * | 9/1998 | Ueno | F16C 33/416 524/505 |
| 6,283,737 B1 | 9/2001 | Kazakis et al. | |
| 6,336,797 B1 | 1/2002 | Kazakis et al. | |
| 6,916,162 B2 | 7/2005 | Schofield et al. | |

(Continued)

FOREIGN PATENT DOCUMENTS

| | | |
|---|---|---|
| CN | 206280258 * | 6/2017 |
| CN | 206280258 U * | 6/2017 |

*Primary Examiner* — Dapinder Singh

(74) *Attorney, Agent, or Firm* — J-TEK LAW PLLC; Scott T. Wakeman; Mark A. Ussai

(57) ABSTRACT

A scroll compressor includes a housing and a rotatable drive shaft disposed within the housing and having an eccentric end portion. First and second support bearings rotatably couple the drive shaft with the housing and each includes a plurality of rolling elements, at least one of which is ceramic, and an annular cage formed of a polymeric material. A scroll member is disposed within the housing chamber and a drive bearing rotatably couples the shaft eccentric portion with the scroll member such that the scroll member orbits about the central axis. The drive bearing includes a plurality of rolling elements, at least one of which is ceramic, and an annular cage formed of a polymeric material. Further, a solution formed of refrigerant and oil is directed to each one of the drive bearing and the first and second support bearings so as to lubricate the rolling elements.

22 Claims, 6 Drawing Sheets

(56) References Cited

U.S. PATENT DOCUMENTS

| | | | | |
|---|---|---|---|---|
| 2006/0196204 | A1* | 9/2006 | Takeuchi | F01K 23/04 62/527 |
| 2007/0172168 | A1* | 7/2007 | Oishi | F04B 1/0417 384/569 |
| 2009/0185930 | A1 | 7/2009 | Duppert et al. | |
| 2013/0251577 | A1 | 9/2013 | Bush et al. | |
| 2016/0003252 | A1* | 1/2016 | Fukaya | F04C 29/0085 418/55.6 |
| 2021/0108836 | A1* | 4/2021 | Furugaki | F04C 29/02 |
| 2024/0175437 | A1* | 5/2024 | Akei | F04C 29/026 |

* cited by examiner 10
12
18
16
28
26
26a
26b
22
16b
14
15a
Ac
24
29a
Lc
15
29
16a
19

28
28b
28a
22
14
30
32
$A_c$
$L_c$
38a
39
15a
38a
38
29
30
39a
29a
SA
15
16

SCROLL COMPRESSOR WITH ROLLING ELEMENT BEARINGS

BACKGROUND OF THE INVENTION

The present invention relates to compressors, and more particularly to bearings for scroll compressors.

Scroll compressors are known and generally include an orbital scroll member with a spiral wall engaged with a mating spiral wall of a fixed scroll member. During compressor operation, the orbital scroll member is driven to orbit about an axis such that the two engaged spiral walls interact to compress a vapor, such as refrigerant, directed between the mating walls. Typically, the orbital scroll member is mounted to an eccentric portion of a shaft that is driven to rotate about an axis, usually by means of an electric motor.

In many applications, such as heat pumps, air conditioning systems, superchargers, etc., a scroll compressor are typically sized relatively small or compact. Such size limitations make the use of conventional lubrication systems complicated and difficult to incorporate. Therefore, in particular with refrigerant compressors, a portion of the refrigerant flowing through the scroll compressor is mixed with oil and directed into components, such as bearings, to provide the necessary lubrication.

SUMMARY OF THE INVENTION

In one aspect, the present invention is a scroll compressor comprising a housing having an interior chamber and a drive shaft disposed within the housing chamber and rotatable about a central axis. The shaft has an eccentric end portion with a centerline spaced from and extending parallel to the central axis. A scroll member is disposed within the housing chamber and a drive bearing is configured to rotatably couple the drive shaft with the scroll member such that the scroll member orbits about the central axis. The drive bearing includes at least one row of rolling elements disposed between the shaft eccentric end portion and the scroll member, at least one of the rolling elements being formed of a ceramic material. Further, a quantity of a solution formed of refrigerant and oil is disposed within the housing chamber, the solution being directed into the drive bearing to lubricate the at least one ceramic rolling element.

In another aspect, the present invention is again a scroll compressor, the compressor comprising a housing having an interior chamber and a drive shaft disposed within the housing chamber, rotatable about a central axis, and having an eccentric end portion with a centerline spaced from and extending parallel to the central axis. A first support bearing and a second support bearing are spaced apart along the central axis, the first and second support bearings rotatably coupling the drive shaft with the housing. Each one of the first and second support bearings includes at least one row of rolling elements and an annular cage having a plurality of pockets, each pocket retaining a separate one of the rolling elements. Each cage is preferably formed of a polymeric material due to low viscosity lubricant providing relatively poor lubrication, but may be formed of other materials such as a coated metal, brass, etc. A scroll member is disposed within the housing chamber and a drive bearing rotatably couples the drive shaft with the scroll member such that the scroll member orbits about the central axis. The drive bearing includes at least one row of rolling elements and an annular cage, which is preferably formed of a polymeric material as discussed above, and has a plurality of pockets, each pocket retaining a separate one of the rolling elements Further, a quantity of a solution formed of refrigerant and oil is disposed within the housing chamber, the solution being directed to each one of the drive bearing and the first and second support bearings so as to lubricate the rolling elements.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
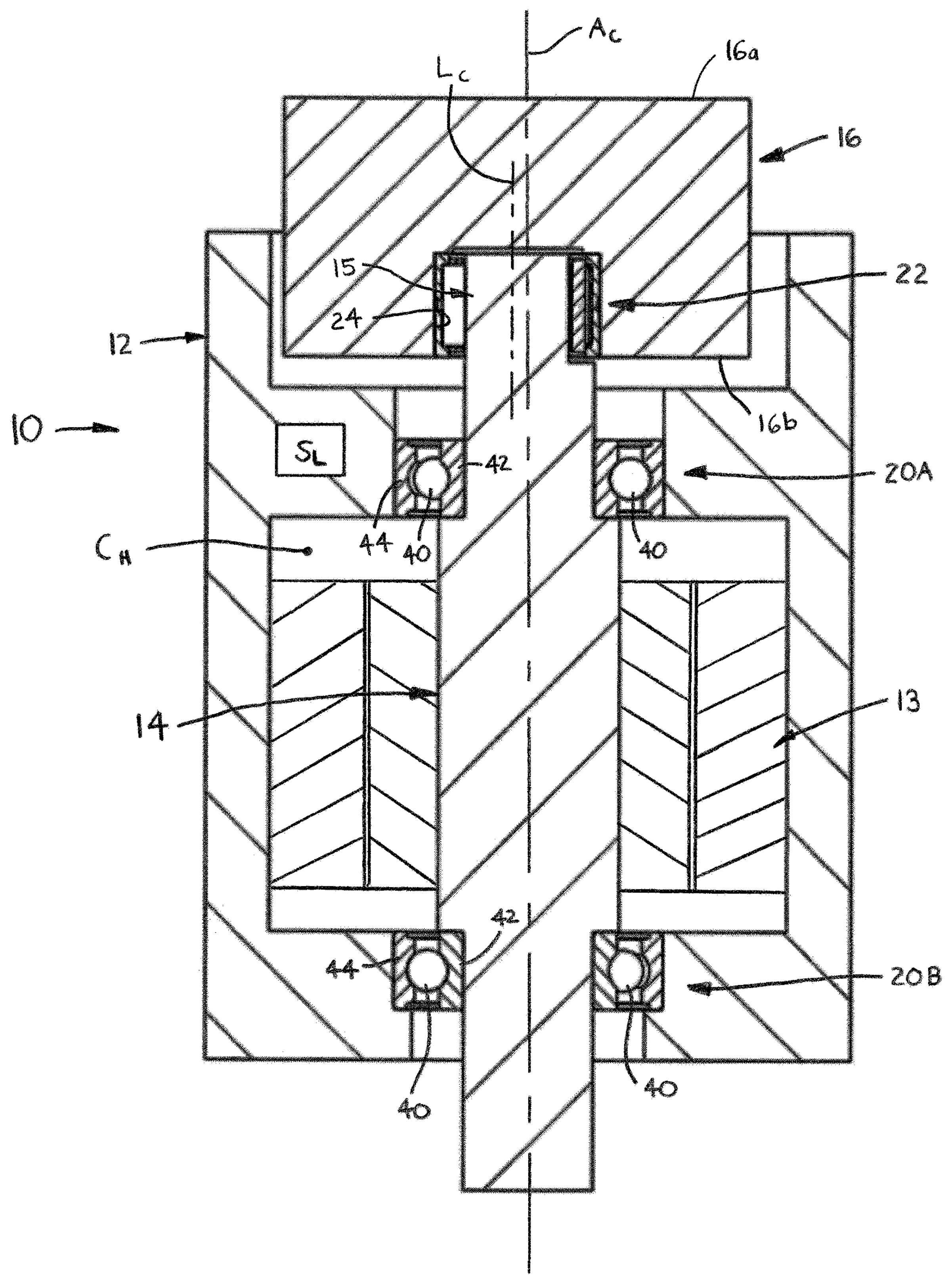
FIG. 1 is an axial cross-sectional view of a simplified version of a scroll compressor in accordance with the present invention.

Certain terminology is used in the following description for convenience only and is not limiting. The words “inner”, “inwardly” and “outer” refer to directions toward and away from, respectively, a designated centerline or a geometric center of an element being described, the particular meaning being readily apparent from the context of the description. Further, as used herein, the words “connected” and “coupled” are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-6 a scroll compressor 10 and its constituent parts, which basically comprises a housing 12 having an interior chamber $C_H$, a motor 13 disposed within the chamber $C_H$, a drive shaft 14 connected to or incorporated into the motor 13, a movable scroll member 16 coupled with the shaft 14 and a fixed scroll member 18. The motor 13 drives the shaft 14 to rotate about a central axis $A_C$, the shaft 14 being rotatably coupled with the housing 12 by first and second rolling element “support” bearings 20A, 20B. The shaft 14 has an eccentric end portion 15 with a centerline $L_C$ spaced from and extending parallel to the central axis $A_C$, the eccentric portion 15 being coupled with the movable scroll member 16 by a rolling element “drive” bearing 22.

As such, rotation of the shaft 14 about the central axis $A_C$ drives the movable scroll member 16 to orbit about the central axis $A_C$ and interact with the fixed scroll member 18 so as to compress a vapor, preferably a refrigerant, which is directed between the two members 16, 18. Further, due to preferred applications in which the compressor 10 is sized relatively small or compact, lubrication of the various compressor components, in particular the bearings 20A, 20B and 22, is achieved by a solution $S_L$ of refrigerant and oil, and preferably about five percent oil in a bulk solution, contained within the housing 12, as schematically depicted in FIG. 1. The refrigerant-oil solution $S_L$, which may consist "locally" (i.e., in the vicinity of the bearings) of a substantially higher percentage of oil, is directed into the drive bearing 22 and the support bearings 20A, 20B by appropriate ducts or fluid lines (none depicted), the solution $S_L$ thus providing relatively low viscosity lubrication.

Figure 2:
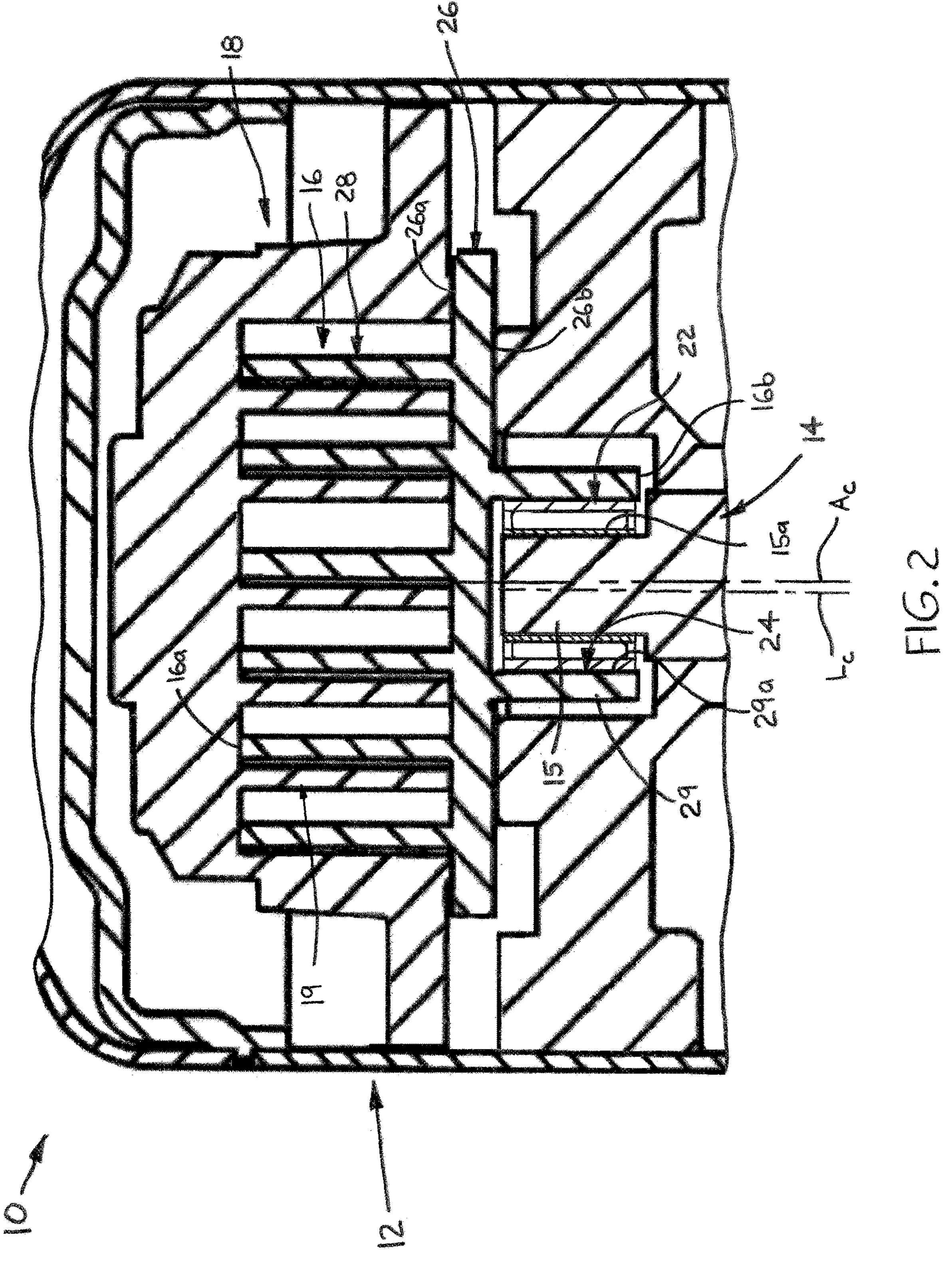
FIG. 2 is a broken-away, axial cross-sectional view of an upper portion of the scroll compressor, showing details of two engaged scroll members.

Referring to FIGS. 1 and 2, the movable scroll member 16 has first and second axial ends 16*a*, 16*b*, the first axial end 16*a* being engaged with the fixed scroll member 18, and a cylindrical bore 24 extending axially inwardly from the second axial end 16*b*, the bore 24 receiving the shaft eccentric end portion 15. Preferably, the movable scroll member 16 includes a baseplate 26 with opposing first and second axial ends 26*a*, 26*b*, respectively, a spiral wall 28 extending axially from the plate first axial end 26*a* and engageable with a mating wall 19 of the fixed scroll member 18, and a cylindrical hub 29 extending axially from the plate second axial end 26*b* and having an inner circumferential surface 29*a* defining the cylindrical bore 24, as depicted in FIG. 2. The eccentric end portion 15 of the shaft 14 has an outer circumferential surface 15*a* and is disposed within the bore 24 of the scroll member hub 28. Further, the drive bearing 22 is disposed within the hub bore 24 and is configured to rotatably couple the shaft eccentric end portion 15 with the movable scroll member 16, as discussed below.

Figure 3:
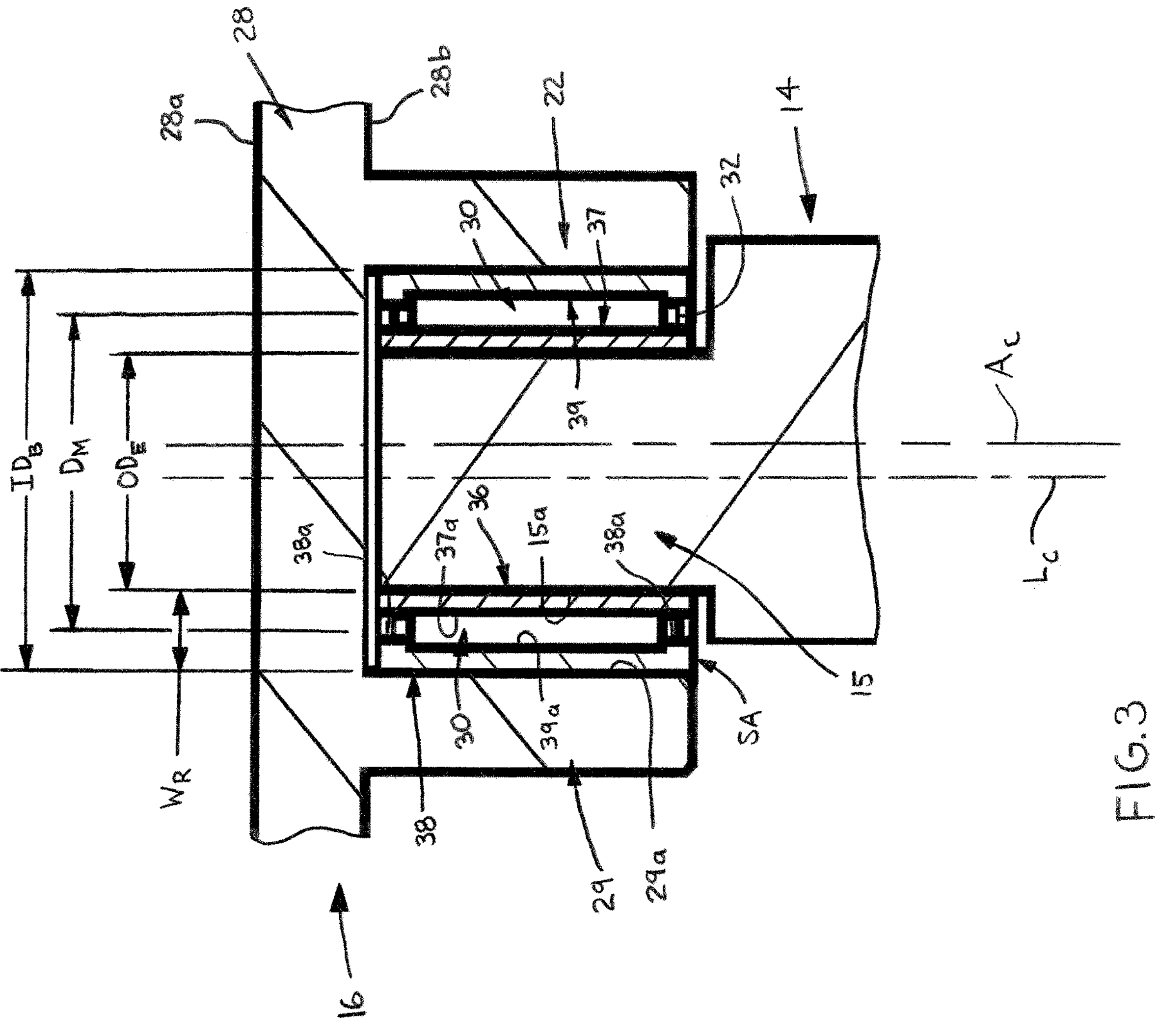
FIG. 3 is an enlarged, broken-away view of a portion of FIG. 2, showing a first construction of a drive bearing.
Figure 4:
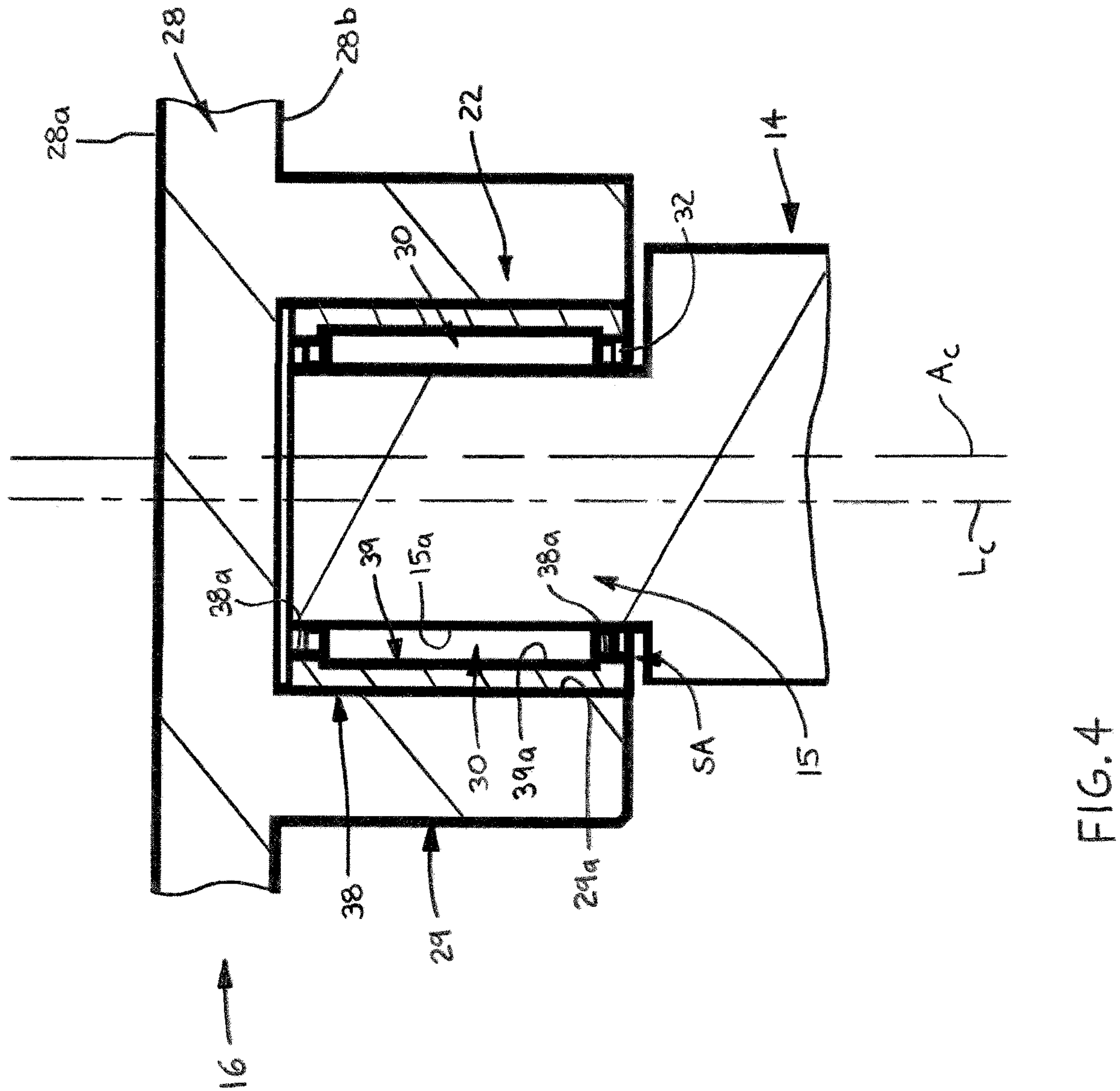
FIG. 4 is another enlarged, broken-away view of a portion of FIG. 2, showing a second construction of the drive bearing.
Figure 5:
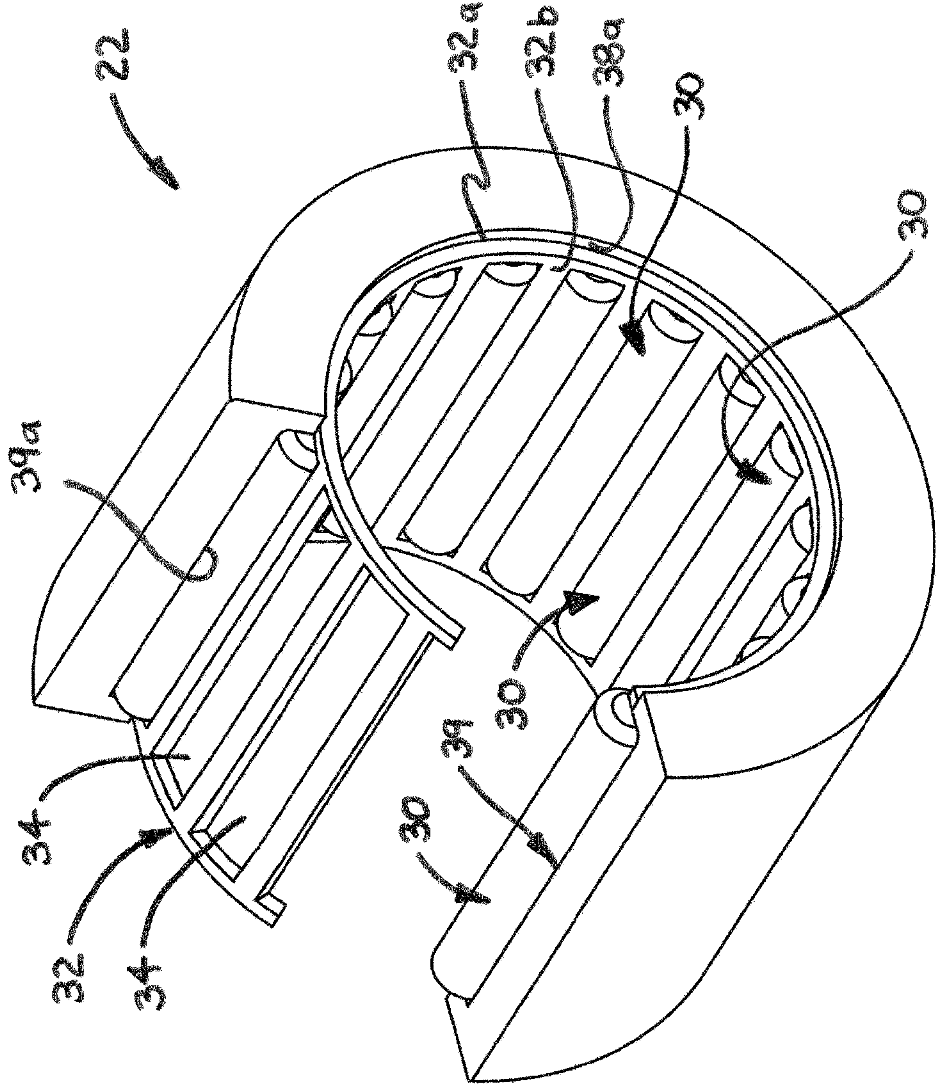
FIG. 5 is a broken-away, perspective view of the drive bearing, shown without an inner ring.
Figure 6:
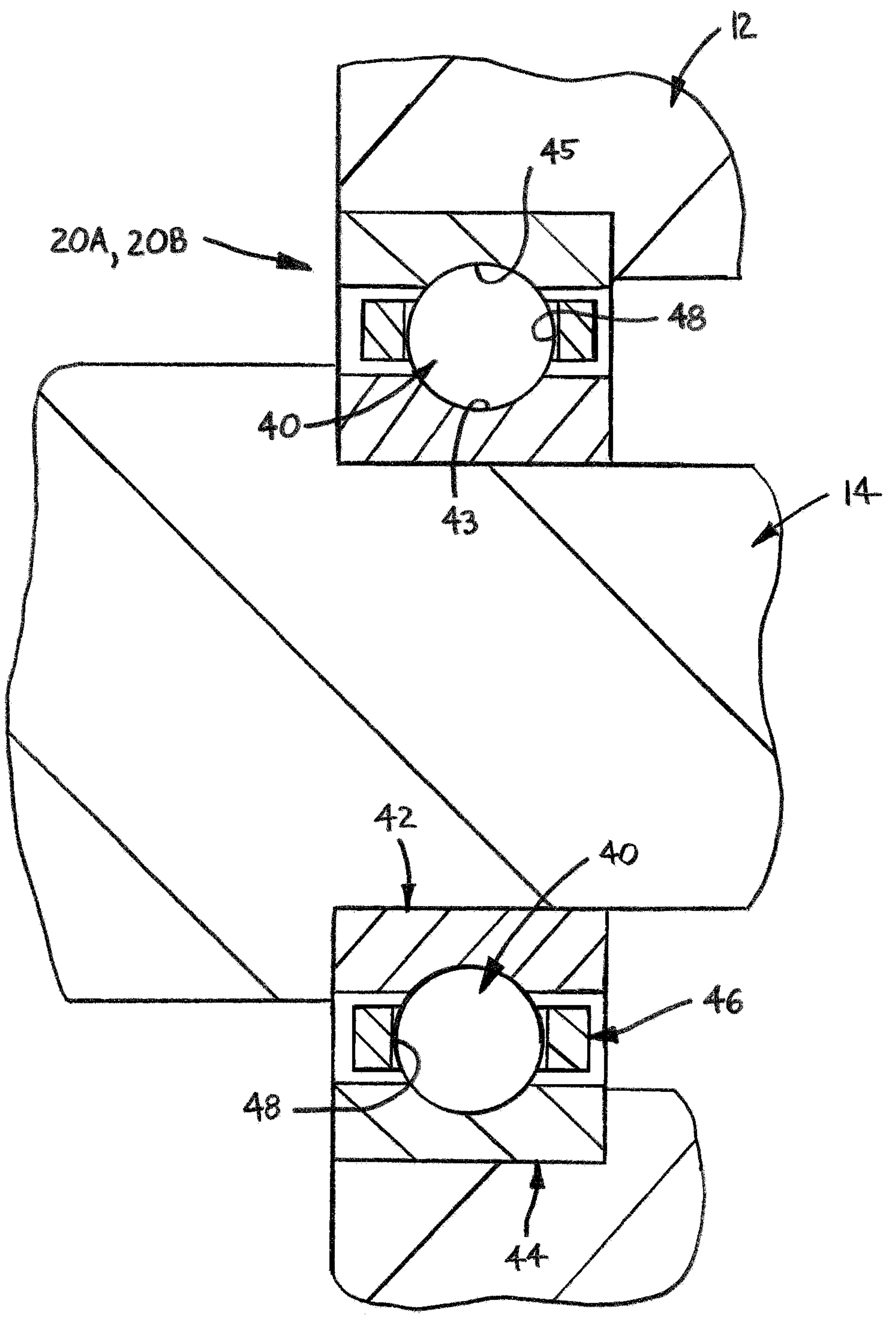
FIG. 6 is a broken-away, enlarged view of a portion of FIG. 1, showing the structure of one support bearing.

Referring to FIGS. 3-5, the drive bearing 22 includes at least one row of rolling elements 30 spaced circumferentially about the centerline $L_C$ of the shaft eccentric portion 15. Each rolling element 30 is preferably a cylinder, and in a presently preferred application, the cylinders are formed and/or sized as needles (i.e., with a length substantially greater than an outer diameter). Preferably, the drive bearing 22 also includes an annular cage 32 having a plurality of circumferentially spaced pockets 34, as best shown in FIG. 5, which is preferably formed of a polymeric material but may alternatively be formed of another appropriate material (e.g., brass, a polymer-coated metal, etc.). Each one of the plurality of rolling elements 30 is disposed within a separate one of the pockets 34 so as to circumferentially space the elements 30. The cage 32 is preferably formed of polyetheretherketone ("PEEK") or polyamide ("PA"), but may alternatively be formed of any other appropriate polymeric material.

Further, the specific structure of the drive bearing 22 and the type of rolling elements 30, i.e., standard cylinders or needles, may vary due to the specific dimensions of the annular space SA between the outer circumferential surface 15*a* of the shaft eccentric portion 15 and the inner circumferential surface 29*a* of the hub bore 24. That is, in a presently preferred compressor 10, the bore 24 of the cylindrical hub 24 has an inside diameter IDB with a value of between nineteen millimeters (19 mm) and eighty millimeters (80 mm) and the eccentric portion 15 of the shaft 14 has an outside diameter ODE with a value of between twelve millimeters (12 mm) and sixty millimeters (60 mm), as indicated in FIG. 3. As the hub 24 is preferably sized to accommodate the size of the shaft eccentric portion 15, i.e., a lesser hub inside diameter IDB with a lesser shaft outside diameter hub ODE and vice-versa, a radial width $W_R$ of the annular space SA has a value of between three and one-half millimeters (3.5 mm) and twenty five millimeters (25 mm).

Furthermore, the drive bearing 22 may include both an inner ring 36 and an outer ring 38, as depicted in FIG. 3. The inner ring 36 is disposed about the shaft eccentric portion 15 and has an inner race 37 and the outer ring 38 is disposed within the scroll member bore 24 and has an outer race 39. With both inner and outer rings 36, 38, the rolling elements 30, and preferably also the cage 32, are disposed between the rings 36, 38 such that each rolling element 30 rolls simultaneously along the inner and outer races 37, 39.

In certain applications in which the radial width $W_R$ is substantially less than the maximum value, the drive bearing 22 may include only the outer ring 38 disposed within the scroll member bore 24 and the rolling elements 30 roll simultaneously against the outer race 39 and directly against the outer circumferential surface 15*a* of the eccentric end portion 15 of the shaft 14, as depicted in FIG. 4. However, either of these constructions of the drive bearing 22 may be used regardless of the specific radial width $W_R$ of a particular application. Further, it is within the scope of the present invention to use any other appropriate construction of the drive bearing 22, such as for example, including only an inner ring 36 and with the rolling elements 30 rolling against the bore surface 29*a*, etc.

Furthermore, to optimize lubrication of the cage 32, it is preferred to guide an outer circumferential surface 32*a* of the cage 32 against the bearing outer ring 38. Specifically, due to the orbiting motion of the movable scroll member 16 and the rotation of the shaft 14, centrifugal forces cause the lubricating solution $S_L$ to collect in greater quantities on the outer ring 38 as compared with the inner ring 36. As such, the outer ring 38 has an inner circumferential guide surface 38*a*, preferably two inner circumferential guide surfaces 38*a* on opposing axial sides of the outer race 39, and the cage 32 correspondingly has at least one and preferably two outer circumferential surfaces 32*a* slidable against the guide surface(s) 38*a*. Thereby, the outer ring 38 supports radial loads applied to the cage 32 and ensures that an inner circumferential surface 32*b* of the cage 32 remains radially spaced from the inner ring 36 or the eccentric end portion 15 of the shaft 14.

Additionally, with the relative sizing of the drive bearing 22, in particular the mean diameter $D_M$ (FIG. 3), in relation to the intended rotational speed of the shaft 14 during compressor operation, the bearing 22 has an "ndm" value of no greater than three hundred thousand millimeters×rotations per minute, i.e., ndm≤300,000 mm×rpm. Specifically, as is known in the art of rolling element bearings, the ndm value of a bearing is the mean diameter of the bearing in millimeters multiplied by the rotational speed of the bearing in rotations per minute. With such a relatively low ndm value and low viscosity lubrication conditions, the lubrication film thickness at the point of contact between each rolling element 30 and the raceways 37/39 or 15*a*/39 tends to be relatively small, making it challenging to adequately lubricant the drive bearing 22. Such reduced quality of the lubrication conditions can lead to reduced bearing life, especially due to the effects of wear and surface initiated fatigue.

Therefore, to increase the robustness of the drive bearing 22 against the effects of poor lubrication, at least one of the rolling elements 30 is formed of a ceramic material, preferably silicon nitride but may alternatively be formed of zirconia or any other appropriate material. In certain applications, a plurality of the rolling elements 30 or even the entire row of rolling elements 30 are formed of ceramic. In addition to reducing friction even under poor lubrication conditions, such as low speed and low viscosity, ceramic rollers also mitigate the effects of contamination. Specifically, contaminate particles produce dents with raised material around them on the bearing raceways that become stress raisers. Due to the fact that ceramic rollers are harder than steel rollers, a ceramic roller will plastically deform the raised edges around the dents to result in a "finer" raceway surface. Such a finer surface is beneficial for better utilizing available lubrication and the elimination of raised material removes stress raisers that may lead to fatigue cracks. Even a single ceramic rolling element 30 will mitigate the effects of contaminants and will also improve lubrication conditions for the remaining rolling elements 30 that are formed of steel.

To further improve lubrication and increase bearing life, the races 37/39 or 15*a*/39 of the drive bearing 22 are preferably finished to a greater degree or extent as compared to the surface finish of a typical rolling bearing. More specifically, when the drive bearing 22 has both inner and outer rings 36, 38, the surface 37*a* of the inner race 37 and the surface 39*a* of the outer race 39 each have a surface roughness with an Ra value of no greater than one tenth of a micrometer (0.1 μm) and preferably less than fifty thousandths of a micrometer (0.050 μm). Similarly, when the drive bearing 22 includes only the outer ring 38 and the rolling elements 30, the surface 39*a* of the outer race 39 and at least a section of the outer surface 15*a* of the shaft eccentric end portion 15 each have a surface roughness with an Ra value of no greater than one tenth of a micrometer (0.1 μm) and preferably less than fifty thousandths of a micrometer (0.050 μm). Thus, the combination of one or more of the rolling elements 30 being ceramic and the relatively fine surface finish of the races 37/39 or 15*a*/39 substantially improves the lubrication conditions and potentially also reduces friction within the drive bearing 22.

Referring now to FIGS. 1 and 5, the first and second support bearings 20A, 20B each includes at least one row of rolling elements 40 and may include two or more rows (only a single row depicted). Preferably, each rolling element 40 is a ball and each support bearing 20A, 20B is formed as a deep groove ball bearing. More specifically, each support bearing 20A, 20B includes an inner ring 42 mounted about the shaft 14 and having an inner race 43 and an outer ring 44 connected with the housing 12 and having an outer race 45.

Further, each support bearing 20A, 20B preferably further includes an annular cage 46 formed of a polymeric material and having a plurality of pockets 48. Each pocket 48 retains a separate one of the rolling elements/balls 40 such that the balls 40 are spaced circumferentially about the central axis $A_C$. Preferably, each cage 46 is formed of polyetheretherketone ("PEEK") or polyamide ("PA"), but may be formed of another appropriate polymeric material.

As with the drive bearing 22, the low viscosity lubrication provided by the refrigerant-oil solution $S_L$ tends to be disadvantageous compared to pure oil or grease for bearing lubrication and fatigue life. However, more oil or higher viscosity potentially reduces compressor efficiency. As such, at least one of the rolling elements 40 is formed of a ceramic material, preferably silicon nitride, and in certain applications, a plurality or even the entire row of rolling elements 40 is formed of ceramic. As a result, the one or more ceramic rolling element 40 improves the fatigue life of each one of the support bearings 20A, 20B against poor lubrication effects from the low viscosity lubrication and potentially improves the efficiency of the compressor 10. The ceramic rolling element(s) 40 also mitigate the potential detrimental effects of contaminants, as discussed above in connection with the drive bearing 22.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A scroll compressor comprising:

a housing having an interior chamber;

a drive shaft disposed within the housing chamber, rotatable about a central axis, and having an eccentric end portion with a centerline spaced from and extending parallel to the central axis;

a movable scroll member disposed within the housing chamber;

a rolling element drive bearing configured to rotatably couple the drive shaft with the movable scroll member such that the scroll member orbits about the central axis, the drive bearing including at least one row of needle rolling elements disposed between the shaft eccentric end portion and the scroll member, at least one of the needle rolling elements being formed of a ceramic material and at least one of the needle rolling elements being formed of steel; and a quantity of a solution formed of refrigerant and oil disposed within the housing, the solution being directed into the drive bearing to lubricate the at least one row of rolling elements.

2. The compressor as recited in claim 1, wherein the at least one row of rolling elements includes a plurality of needle rolling elements formed of a ceramic material.

3. The compressor as recited in claim 1, wherein the movable scroll member includes first and second axial ends, the first axial end being engageable with a mating fixed scroll, and a cylindrical bore extending axially inwardly from the second axial end, the drive bearing being disposed within the cylindrical bore.

4. The compressor as recited in claim 3, wherein the cylindrical bore of the movable scroll member has an inside diameter with a value of between nineteen millimeters and eighty millimeters and the eccentric portion of the shaft has an outside diameter with a value of between twelve millimeters and sixty millimeters.

5. The compressor as recited in claim 3, wherein the drive bearing includes an outer ring disposed within the bore of the cylindrical hub and the at least one row of rolling elements roll directly against an outer circumferential surface of the eccentric portion of the shaft.

6. The compressor as recited in claim 5, wherein the outer circumferential surface of the eccentric portion of the shaft has a surface roughness with an Ra value of no greater than one tenth of a micrometer (0.1 μm).

7. The compressor as recited in claim 1, wherein the drive bearing further includes an annular cage formed of a polymeric material, the cage having a plurality of circumferentially spaced pockets and each one of the row of rolling elements is disposed within a separate one of the pockets.

8. The compressor as recited in claim 7, wherein the polymeric material is polyetheretherketone or polyamide.

9. The compressor as recited in claim 8, wherein the drive bearing includes an outer ring connected with the scroll member and having an inner circumferential guide surface, the cage having an outer circumferential surface slidable against the guide surface of the outer ring.

10. The compressor as recited in claim 1, further comprising a first support bearing and a second support bearing spaced apart from the first support bearing along the central axis, the first and second support bearings rotatably coupling the drive shaft with the housing and each one of the first and second support bearings including at least one row of rolling elements, at least one of the rolling elements of each one of the support bearings being formed of a ceramic material.

11. The compressor as recited in claim 10, wherein each one of the first and second support bearings is a deep groove ball bearing.

12. The compressor as recited in claim 10, wherein a portion of the solution of refrigerant and oil is directed into each one of the first and second support bearings to lubricate the at least one row of rolling elements.

13. The compressor as recited in claim 1, wherein the shaft rotates at an intended angular speed during compressor operation and the drive bearing has a mean diameter sized such that the ndm factor of the bearing during compressor operation is no greater than three hundred thousand.

14. A scroll compressor comprising:

a housing having an interior chamber;

a drive shaft disposed within the housing chamber, rotatable about a central axis, and having an eccentric end portion with a centerline spaced from and extending parallel to the central axis;

a first support bearing and a second support bearing spaced apart from the first support bearing along the central axis, the first and second support bearings rotatably coupling the drive shaft with the housing and each one of the first and second support bearings including at least one row of rolling elements and an annular cage formed of a polymeric material and having a plurality of pockets, each pocket retaining a separate one of the rolling elements;

a scroll member disposed within the housing chamber;

a drive bearing rotatably coupling the drive shaft with the scroll member such that the scroll member orbits about the central axis, the drive bearing including at least one row of needle rolling elements, at least one of the needle rolling elements being formed of a ceramic material and at least one of the needle rolling elements being formed of steel, and an annular cage formed of a polymeric material and having a plurality of pockets, each pocket retaining a separate one of the needle rolling elements; and a quantity of a solution formed of refrigerant and oil disposed within the housing, the solution being directed to each one of the drive bearing and the first and second support bearings so as to lubricate the rolling elements.

15. The compressor as recited in claim 14, wherein the polymeric material of each annular cage is polyetheretherketone or polyamide.

16. The compressor as recited in claim 14, wherein the drive bearing includes an outer ring connected with the scroll member and having an inner circumferential guide surface, the annular cage of the drive bearing having an outer circumferential surface slidable against the guide surface of the outer ring.

17. The compressor as recited in claim 14, wherein the scroll member includes first and second axial ends, the first axial end being engageable with a mating fixed scroll, and a cylindrical bore extending axially inwardly from the second axial end, the drive bearing being disposed within the cylindrical bore.

18. The compressor as recited in claim 17, wherein the cylindrical bore of the movable scroll member has an inside diameter with a value of between sixty millimeters and eighty millimeters and the and the eccentric portion of the shaft has an outside diameter with a value of between twelve millimeters and twenty-four millimeters.

19. The compressor as recited in claim 14, wherein the drive bearing includes an outer ring disposed within the bore of the cylindrical hub and the at least one row of rolling elements roll directly against an outer circumferential surface of the eccentric portion of the shaft.

20. The compressor as recited in claim 19, wherein the outer circumferential surface of the eccentric portion of the shaft has a surface roughness with an Ra value of no greater than one tenth of a micrometer (0.1 μm).

21. The compressor as recited in claim 14, wherein each rolling element of the first and second support bearings is a ball.

22. The compressor as recited in claim 14, wherein the shaft rotates at an intended angular speed during compressor operation and the drive bearing has a mean diameter sized such that the ndm factor of the drive bearing during compressor operation is no greater than three hundred thousand.

* * * * *